Figure 1:
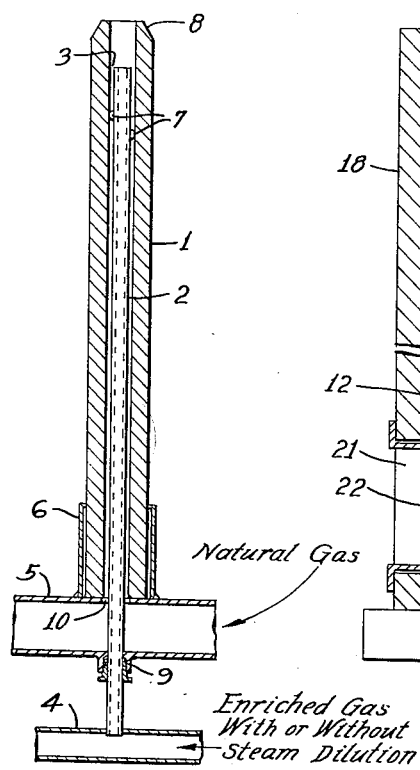

March 29, 1955 — W. C. EKHOLM — 2,705,189

CARBON BLACK

Filed Oct. 12, 1949

INVENTOR
*Wesley C. Ekholm*
BY
*Pennie Edmonds Morton & Barrows*
ATTORNEYS

United States Patent Office 2,705,189
Patented Mar. 29, 1955

2,705,189
CARBON BLACK

Wesley C. Ekholm, Roslyn Heights, N. Y., assignor to Columbian Carbon Company

Application October 12, 1949, Serial No. 120,972

7 Claims. (Cl. 23—209.4)

The present invention relates to the manufacture of carbon black and provides an improved process whereby marked economy in raw materials may be effected.

In the past, natural gas has served as the principal raw material in the manufacture of carbon pigments, largely because of its availability at relatively low cost. However, the thermo-dynamic stability and relative oxidation rate of the principal natural gas hydrocarbon, i. e., methane, are such that higher molecular weight, more easily decomposed hydrocarbons have more recently been found attractive for use as the sole raw material in some furnace processes and for enrichment of natural gas in other furnace processes.

As employed in these furnace processes, the higher molecular weight hydrocarbons, especially the unsaturated heavier hydrocarbons, tend to increase the carbon black concentration in the effluent furnace gases and thus reduce capital investment and labor cost for recovering a pound of carbon from the effluent gases. In addition, certain types of enriching hydrocarbons have been found advantageous for developing characteristic desirable properties in the carbon black product. Frequently, natural gas is not the optimum raw material for producing carbon black, either from the standpoint of yield or quality of the resultant carbon black. On the other hand, these more reactive, higher molecular weight hydrocarbons are almost invariably more expensive than natural gas.

In practically all, if not all, carbon black producing processes, the decomposing of the hydrocarbon is a pyrolytic reaction, frequently of an endothermic character. Heat for producing and maintaining the necessary high reaction temperature is ordinarily produced by the burning of a portion of the same hydrocarbon material being thermally decomposed. This, of course, results in the conversion of substantial amounts of the carbon of the hydrocarbon to carbon oxides, reactions serving no useful purpose other than the liberation of heat.

Thus, when a stream of hydrocarbon gas is caused to flow from a tube, for instance, into a quiescent, oxidizing atmosphere of a highly heated furnace chamber, the oxidizing atmosphere of the chamber reacts with the hydrocarbons along the outer surface of the gas stream forming a sheath of flame surrounding an inner core of gaseous hydrocarbons undergoing thermal decomposition, while shielded by the flame sheath from the oxidizing furnace atmosphere.

It is a primary object of my present invention to repress or inhibit the consumption of the more costly, higher molecular weight hydrocarbons by such side reactions, e. g., oxidizing reactions resulting in the formation of carbon oxides such as CO and $CO_2$. This and other useful objects are accomplished, in accordance with my present invention, by shielding the more expensive, higher molecular weight hydrocarbons, flowing as a gaseous stream, e. g., as gas, vapor, or a mixture of gas and vapor, into the oxidizing furnace atmosphere, by a surrounding, contiguous sheath of a different and preferably less expensive hydrocarbon gas, for instance, natural gas. Upon contact with the oxidizing furnace atmosphere, the surrounding sheath of the natural gas will burn, forming a sheath of flame about the inner core of the more costly hydrocarbons with liberation of heat for maintaining the reaction temperature.

The invention is not restricted to any particular furnace operation, but is applicable to a number of different operations in which a stream of hydrocarbons is injected into an oxidizing furnace atmosphere. It is applicable, for instance, to operations in which the decomposition to form the carbon black is effected under relatively quiescent furnace conditions, such as previously described. It is also applicable to operations wherein the hydrocarbon to be decomposed to form the carbon black is injected as a stream or streams into highly turbulent oxidizing blast flame gases, such as described, for instance, in Patent No. 2,440,424, issued April 27, 1948, on application of Wiegand and Braendle.

The stream of higher molecular weight hydrocarbon surrounded by the protective layer of natural gas may be formed by passing the respective gaseous hydrocarbons through concentrically positioned tubes, the higher molecular weight hydrocarbon being passed through the center tube and the natural gas, for instance, being passed through the annular space surrounding the center tube. The size of the two tubes and the relative gas velocities should be carefully proportioned to prevent excessive turbulence between the two emerging gas streams. The annular stream of natural gas thus serves as a protecting sheath to the core of the higher molecular weight hydrocarbon and to a large extent, at least, supplies the hydrocarbon material required for combustion and a relatively large proportion of that consumed by other side reactions.

The inner tube may be metal and is preferably thin-walled. The tube walls may, with advantage, be tapered at their upper ends to a knife edge in the case of a metal tube in order to minimize eddy currents at the discharge end. The outer tube is usually of refractory materials, such as, Carborundum, or Alundum, and this may also, with advantage, in some instances, be tapered at the discharge end.

A particularly desirable separation of the inner and outer streams as they emerge from the concentric tubes has been obtained when the ratio of inner stream velocity to outer stream velocity is within the range of 0.5:1 to 6:1, advantageously less than 3:1.

It has been found advantageous to recess the inner tube within the outer tube at the discharge end in order to protect the former from excessive temperature which might lead to early failure of the inner tube, for instance, or bring about cracking of the more readily decomposed higher molecular weight hydrocarbons of the center stream with a resultant coke formation on the walls of the inner tube. I have obtained particularly desirable results with maximum persistence of integrity of the inner stream using relatively low gas velocities of around 15 feet per second in the outer tube and having an outer tube of about ½ inch I. D. with the inner tube recessed not more than about 1 inch. At higher velocities and with larger tubes, the inner tube may be retracted to a greater extent. The velocities just noted, and elsewhere appearing herein, are based on calculations at 60° F.

As applied to a free flame process, the volume of natural gas supplied through the outer, annular stream should, with advantage, be sufficient to supply at least ¼ and preferably about ½, or more, of the total heat value of both streams. This annular stream burns through interdiffusion and turbulent mixing with the surrounding air and thus supplies heat for decomposing the inner, protected stream of more costly hydrocarbons. It also supplies, to a large extent, the hot combustion products required for dilution and control of particle size in the process.

In operations of this type, the inner stream may be enriched with an easily decomposed hydrocarbon material of an unsaturated, aromatic, or naphthenic, nature, such as ethylene, acetylene and aromatic type fuel oils as produced in the thermal and catalytic cracking of petroleum. Such materials have been found to be especially advantageous for developing the characteristic termed "structure" in carbon blacks.

Likewise, the carbon black producing capacity of a unit of given size may be substantially increased by enriching the make gas with a higher molecular weight hydrocarbon, or by substituting higher molecular weight hydrocarbons for all or part of the make gas normally used.

Figure 2:
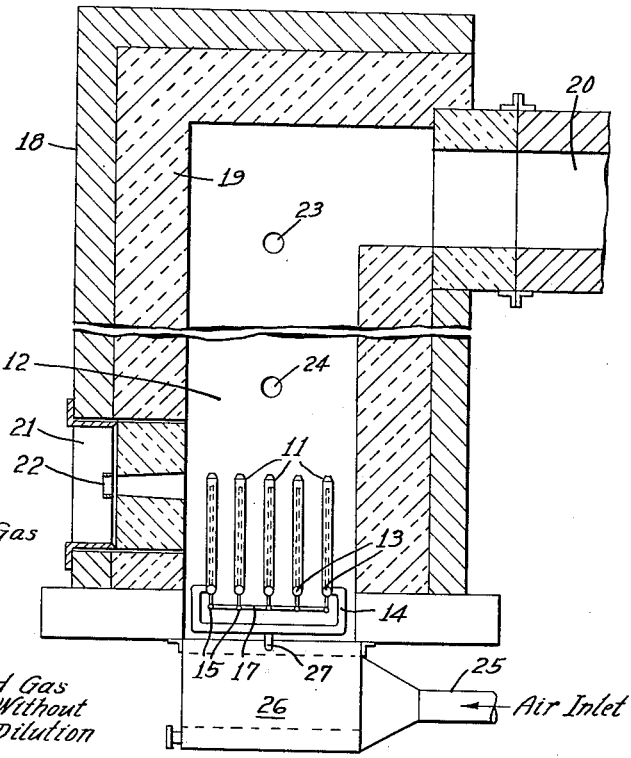
Figure 3:
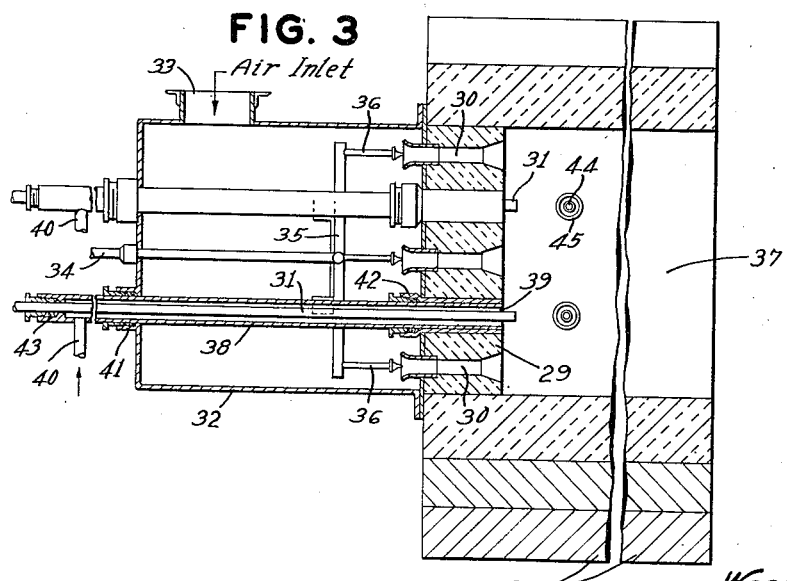

The invention will be further described and illustrated with reference to the accompanying drawings of which:

Figure 1 is a view, partly in section, of a simplified burner arrangement adapted to be used, in accordance with my present process, Figure 2 represents a somewhat diagrammatic elevation view, partly in section, of a vertical carbon black furnace of the free flame type, and Figure 3 represents a vertical, mostly sectional view, of a horizontal furnace of the general type disclosed in United States Letters Patent No. 2,378,055, wherein the hydrocarbon to be decomposed is forcefully injected into a turbulent blast flame.

In the simplified burner arrangement shown in Figure 1, a highly refractory tube, fabricated of Carborundum, Alundum, or the like, is shown at 1. Extending coaxially through tube 1, there is a metal alloy tube 2. The outer tube may, for instance, have an inside diameter of approximately ½ inch and the inner tube may, for instance, have an outside diameter of, say, 0.3 inch, leaving an annular space 3 between the tubes. As shown, the inner tube 2 is connected at its lower end with a conduit or a feed line 4. The annular space 3 opens at its lower end into the conduit or feed line 5 and the outer tube is removably supported at the lower end by the socket or collar 6 permanently fastened as by welding, or the like, to the conduit 5. The inner tube is horizontally supported at its upper end by the staggered centering guides 7.

Advantageously, the outer tube is tapered at its upper end, as shown at 8, for the purpose of diminishing turbulence and rapid interdiffusion of the outer sheath of gases and the upwardly rising oxidizing furnace atmosphere. In the drawing, the inner tube is shown with its upper end depressed substantially below the upper end of the outer tube. The extent of this depression is subject to considerable variation, the optimum depression depending upon the relative diameters of the inner and outer tubes and operating conditions including the relative velocities of the inner stream, the annular stream and the outer oxidizing furnace atmosphere. Advantageously, the tube 2 is adjustably sealed by packing gland 9, or the like, into the lower wall of the conduit 5, extending through the somewhat larger opening 10 in the opposite wall of conduit 5, so that it may be moved up or down to attain the desired amount of depression of the inner tube.

In Figure 2, burners 11 of the general type shown in detail in Figure 1 are shown as vertically positioned in the lower portion of furnace chamber 12. The outer tubes of these burners are supported by the headers 13 as shown in Figure 1, for instance, and these headers are supplied with natural gas, or the like, through branched conduits 14. The inner tubes of the respective burners are connected to, and supported by, the headers 15, which are in turn connected with the cross-headers 17 through which the heavier hydrocarbons in gaseous form are supplied by any suitable means.

The furnace is enclosed by a suitable wall 18 lined with firebrick, or the like, 19 and provided with an outlet flue 20, furnace door 21 for servicing and cleaning the furnace and burners and peephole 22 for observing the operation of the burners. The furnace is also provided with temperature observation ports 23 and 24.

In operation, air for supporting combustion is passed into the lower end of the chamber through conduit 25 and distributing box 26. By the latter, the air is uniformly distributed over the transverse area of the furnace chamber, and passes upwardly around and between the tubes 11 as a relatively slow-moving quiescent stream of very low turbulence.

Natural gas is supplied from any convenient source through conduit 27 and branched conduits 14 to headers 13 and, from thence, through the annular spaces 3 of the respective burners. The higher molecular weight gaseous hydrocarbon is supplied from any convenient source through the headers and cross-headers 15 and 17 to the lower end of the inner tubes 2, and passes upwardly therethrough to the upper tip of the burner and issues from the upper end of the inner tube as a central stream surrounded by a sheath of the natural gas. As these streams enter into the hot oxidizing atmosphere of the furnace chamber, the outer annular stream is ignited, forming a sheath of flame which supplies heat for maintaining the desired furnace temperature and for effecting the decomposition of the inner stream of higher molecular weight hydrocarbons.

In this type of furnace, where the atmosphere is relatively quiescent, the integrity of the entering streams of gas persists for a substantial period of time forming relatively long individual flames extending upwardly from the upper tip of the burner tubes. The carbon black thus formed, is carried up through the furnace by the rising gases and out through the flue 20 to conventional coolers and separators.

In Figure 3, a horizontally elongated reaction chamber is represented at 28. In the upstream end of this chamber is positioned a burner block 29 having burner ports 30 and make gas injection tubes 31 extending therethrough. The outer end of the burner block is hermetically sealed into one end of a wind-box 32 to which air is supplied under pressure through air inlet 33. Fuel gas is supplied through conduit 34 to header 35 and, thence, through spuds 36 which jet the fuel gas into the ports 30, where it mixes with the air passing through the ports forming a combustible mixture which upon entering the furnace chamber 37 at high velocity, burns, forming a violently turbulent stream of blast flame gases.

In normal operation of a furnace of this type, the gas to be decomposed to form the carbon black may be injected into these hot turbulent blast flame gases through a conduit, or plurality of conduits, such as shown at 31, extending into the furnace chamber in a direction substantially parallel with the axis of the chamber. As an alternative, the make gas may be injected into the blast flame gases in a direction substantially at right angles to the axis of the furnace chamber, as subsequently described.

At the point of injection of the make gas by either of these alternatives, the blast flame gases are usually of an oxidizing nature so that a substantial proportion of the make gas is consumed by unprofitable side reaction. An advantage of operations of the sort illustrated and disclosed in the said patent is the fact that the fuel gas may be different from the make gas. For instance, the fuel gas may be an inexpensive natural gas, of relatively low B. t. u. value, while the "make" is a richer gas. However, for a brief interval following injection of the make gas into the furnace chamber, there is appreciable burning of the make gas.

As applied to this latter type of operation, my present invention provides for the shielding of the separately injected make gas stream, or streams, from the oxidizing furnace atmosphere until such time as the make gas stream is shattered by the turbulent blast flame gases. This may be accomplished by surrounding the make gas injection tubes 31 by a coaxially positioned tube of larger diameter, such as indicated at 38, so as to form an annular space 39 through which the less expensive hydrocarbon, for instance, natural gas, is separately injected into the furnace. This natural gas, for instance, may be supplied to the annular tubes through inlets indicated at 40. Advantageously, the outer tube 38 is adjustably sealed into the wind-box and into the burner block by conventional means, for instance, packing glands represented at 41 and 42, respectively, so as to permit adjustment of the inner end of the tube with respect to the face of the burner block. Likewise, it is desirable that the inner tube 31 be adjustably sealed into the outer tube, as by packing glands 43, so that the inner end of the inner tube may be adjusted with respect to the inner end of the outer tube.

Where it is desired to introduce the make gas at a substantial angle to the axis of the furnace chamber, the make gas may be injected into the furnace chamber by tubes represented at 44, surrounded by the coaxially positioned tube of larger diameter 45 so as to form an annular space between the two tubes, as previously described. The inner end of these tubes may terminate at approximately the inner face of the furnace wall, or the outer tube may project a short distance into the furnace chamber, the inner tube being protected, as previously described, by having its inner end repressed from the inner end of the outer tube, which is generally of a more refractory material.

It will be understood that, in place of, or in addition to, the make gas injection ports 44, other ports may be used suitably positioned with respect to the face of the burner block.

Optimum velocity of the make gas stream will vary considerably with the type of operation, that is, whether the operation is of the free flame type, illustrated in Figure 2 of the drawing, or of the blast flame type illustrated in Figure 3 of the drawing. It will also vary in the blast flame type of operation depending upon whether the make gas is injected substantially parallel to the axis of the furnace chamber, or is injected through the side walls.

In the free flame type of operation, the make gas stream velocity may, with advantage, be varied within the range of about 2 to 30 feet per second. In the blast flame type of operation wherein the make gas is injected parallel to the axis of the furnace chamber, the velocities may, with advantage, vary within the range of about 15 to 150 feet per second. Where the make gas stream is injected at a substantial angle to the path of the blast flame gases through the furnace chamber, the velocity of the make gas stream will depend upon the diameter of the stream and upon the velocity of the blast flame gases. Advantageously, the ratio of the mass velocity of the make gas stream to the mass velocity of the blast flame gases should fall within the range of 3:1 to 10:1 as more fully described and claimed in application Serial No. 16,585, filed March 23, 1948, now Patent No. 2,597,232, of which the present applicant is one of the joint applicants.

The invention, as applied to a process of the free flame type, may be illustrated by an operation carried on in apparatus such as shown by Figure 2 of the drawings, the furnace chamber being square, 21 inches on the side, and measuring 6 feet 9 inches high, and discharging into a flue 20, 14½ inches in diameter and 9 feet 9 inches long. The burner assembly consists of 25 tubes spaced on 3½ inch centers, the outer tube 1 being 12 inches high, ½ inch I. D., 1¼ inch O. D. and the inner tube being 0.242 inch I. D. and 0.312 inch O. D. The outer tube was Carbofrax and the inner tube was a heat-resistant alloy, the inner tube being depressed approximately 1 inch below the tip of the outer tube.

Air was supplied to the lower end of the furnace chamber at the rate of 8,000 cubic feet per hour. Unenriched natural gas was passed through the annular spaces of the burner assembly at an aggregate rate of 920 cubic feet per hour. The same natural gas, enriched by the addition thereto of aromatic gas oil at the rate of 2.75 gallons per hour, was passed through the inner tubes at the aggregate rate of 460 cubic feet per hour. The velocity of the gaseous material flowing from the inner tube, calculated 60° F., was 16 feet per second and that of the gas flowing from the annular passageway was 12.2 feet per second, a velocity ratio of 1:31:1. Also in this operation, the "make" was preheated to a temperature of about 500° F.

As a result of this operation, there is produced 15.5 pounds of carbon black per thousand cubic feet of natural gas consumed. The resultant black had an ABC color of 79 and an oil absorption value, by the stiff paste method, of 19.4.

As illustrative of the invention as applied to operations of the blast flame type, the following operations were carried on in a furnace such as indicated by Figure 3 of the drawing, the furnace being 11 inches wide, 25 inches high and 20 feet long. The blast burner assembly was substantially as shown, comprising a burner block 9 inches deep, having two make gas injection tubes, extending into the chamber in a direction substantially parallel to the axis of the chamber and 13 blast burner ports, the make gas injection tubes and burner ports being uniformly spaced over the surface of the burner block, 3 rows wide and 5 rows high, each of the make gas injection tubes being positioned so as to be flanked on all sides by blast burner ports.

The outer tube, such as illustrated at 38 was a 2¾ inch O. D. Carbofrax tube, 2 inches I. D. The blast burner ports at the inner face of the burner block were 3 inches in diameter and these ports at their throat were 1⅝ inches in diameter.

The results of these runs are set forth in the following tabulation. Runs #2 and #4 were not made in accordance with the present invention but are given for comparative purposes. In those two runs, the inner tube was omitted, and the outer tube projected 12 inches beyond the face of the burner block. Conditions of runs #1 and #3 were substantially identical with runs #2 and #4, except that in these runs #1 and #3, a ¾ inch pipe size, stainless steel tube, concentric with the Carbofrax outer tube and projecting 10½ inches beyond the face of the burner block was used for injection of the make gas. Other operating conditions and the results were as follows:

Table

| Run | 1 | 2 | 3 | 4 |
|---|---|---|---|---|
| Air/Gas Ratio—Blast | 12.5 | 12.5 | 14.6 | 14.5 |
| Air/Gas Ratio—Total | 5.6 | 5.6 | 5.6 | 5.6 |
| Blast Air, C. F. H | 43,000 | 43,000 | 43,000 | 43,000 |
| Blast Gas, C. F. H | 3,440 | 3,440 | 2,960 | 2,960 |
| Make Gas—Total C. F. H | 4,240 | 4,240 | 4,720 | 4,720 |
| Make Gas—Annular C. F. H | 3,587 | | 3,985 | |
| Make Gas—Core C. F. H | 653 | | 735 | |
| Velocity Ratio Core/Annulus | .71 | | .51 | |
| Enriching Oil—Gals. per Hr | 21.1 | 21.1 | 23.6 | 23.6 |
| Yield #/MCF | 10.9 | 10.3 | 12.6 | 11.7 |
| Color, ABC | 101 | 95 | 95 | 90 |
| Tinting Strength | 73 | 65 | 71 | 65 |
| Oil Absorption | 8.4 | 9.1 | 9.5 | 9.1 |

In each run, the make gas was enriched by the addition thereto of uncracked distillate oil at the indicated rate. In test runs #2 and #4, the B. t. u. value of the make gas was 1590. In runs #1 and #3, the B. t. u. value of the natural gas injected through the annulus was 960 and the B. t. u. value of the enriched gas injected as the core stream was 5,000.

The invention contemplates operations in which the core or center stream is straight, vaporized, normally liquid hydrocarbons, or other highly aromatic, or unsaturated hydrocarbons and also operations in which the hydrocarbons constituting the core, or center stream are diluted with steam, or relatively inert gases, such as are sometimes desirable for controlling particle size and preventing tube coking.

The composition of the outer annular sheath of gas is relatively unimportant from a technical standpoint so long as it is a combustible gas substantially free from oxygen. It may, for instance, be natural gas, oil refinery tail gases, or other combustible gases. Economically, the use of natural gas for this purpose has generally been found to be desirable.

I claim:

1. In the process for producing carbon black by the decomposition of hydrocarbons wherein the hydrocarbon to be decomposed is passed into the atmosphere of a highly heated furnace chamber, said chamber being at a temperature at which the hydrocarbons are decomposed to carbon black and said atmosphere containing reactive oxygen in a proportion sufficient to burn only a portion of the hydrocarbon so introduced, and in which the remaining portion of the hydrocarbons is decomposed by heat absorbed from said hot gases to form carbon black in suspension, and the suspension is withdrawn from the chamber and the carbon black separated therefrom, the step of introducing said hydrocarbons into the furnace chamber as a compact gaseous stream substantially free from reactive oxygen and composed of a central core consisting essentially of gaseous hydrocarbons containing substantial amounts of hydrocarbons having a molecular weight higher than that of methane and a coaxial, annular, contiguous, sheath composed of a fuel gas relatively poorer in carbon content.

2. The process of claim 1 in which the sheath of fuel gas is burned by reacting with free oxygen present in the furnace atmosphere thereby supplying heat for the decomposition of the inner core.

3. The process of claim 1 in which the sheath of fuel gas is composed essentially of methane.

4. The process of claim 1 in which the central core of the gas stream contains substantial proportions of normally liquid, aromatic hydrocarbons.

5. The process of claim 1 in which said gaseous stream is passed upwardly into a relatively quiescent atmosphere in the furnace chamber through vertically positioned concentric tubes of relatively small diameters, a current of air is passed upwardly around the outer tube, thereby burning a portion at least of the fuel gas composing said annular sheath to form a quiescent flame, and the gaseous hydrocarbons containing substantial amounts of hydrocarbons having a molecular weight higher than that of methane are passed upwardly as a stream concentrically positioned within the sheath of burning gases.

6. The process of claim 1 in which said stream of gaseous hydrocarbons is injected at high velocity into a turbulent stream of hot combustion gases flowing through an elongated, heat-insulated chamber, the said stream of hydrocarbon being injected in a direction substantially parallel with the longitudinal axis of said chamber.

7. The process of claim 6 in which said gaseous hydrocarbons are injected into the furnace chamber as a plurality of streams uniformly spaced over the transverse area of the chamber.

References Cited in the file of this patent

UNITED STATES PATENTS

| | | | |
|---|---|---|---|
| 2,216,508 | Zinc | Oct. 1, | 1940 |
| 2,303,648 | Lemster et al. | Dec. 1, | 1942 |
| 2,419,565 | Krejci | Apr. 29, | 1947 |
| 2,499,438 | Wiegand et al. | Mar. 7, | 1950 |